(12) United States Patent  (10) Patent No.: US 11,550,576 B2
Kawahara et al.  (45) Date of Patent: Jan. 10, 2023

(54) ARITHMETIC PROCESSING DEVICE HAVING MULTICORE RING BUS STRUCTURE WITH TURN-BACK BUS FOR HANDLING REGISTER FILE PUSH/PULL REQUESTS

(71) Applicant: FUJITSU LIMITED, Kawasaki (JP)

(72) Inventors: Jun Kawahara, Kawasaki (JP); Seishi Okada, Kawasaki (JP); Masanori Higeta, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 16/174,333

(22) Filed: Oct. 30, 2018

(65) Prior Publication Data

US 2019/0179636 A1  Jun. 13, 2019

(30) Foreign Application Priority Data

Dec. 7, 2017  (JP) .............................. JP2017-235211

(51) Int. Cl.
*G06F 9/312* (2018.01)
*G06F 9/30* (2018.01)
*G06F 15/17* (2006.01)
*G06F 15/173* (2006.01)

(52) U.S. Cl.
CPC ........ *G06F 9/30043* (2013.01); *G06F 9/3001* (2013.01); *G06F 9/30032* (2013.01); *G06F 9/30098* (2013.01); *G06F 15/17* (2013.01); *G06F 15/17312* (2013.01)

(58) Field of Classification Search
CPC ............... G06F 9/3001; G06F 9/30043; G06F 9/30098; G06F 13/14; G06F 15/163; G06F 15/17; G06F 15/173; G06F 15/17306; G06F 15/17312; G06F 9/30032
See application file for complete search history.

(56) References Cited

U.S. PATENT DOCUMENTS 6,654,834 B1    11/2003 Robertson et al.
2007/0124532 A1*  5/2007 Bennett ............... G06F 13/4027
                                                            711/100
2007/0165457 A1   7/2007 Kim
(Continued)

FOREIGN PATENT DOCUMENTS

JP    2001-092772 A    4/2001
JP    2009-531746 A    9/2009
WO    2007/109888 A1   10/2007

*Primary Examiner* — David J. Huisman
(74) *Attorney, Agent, or Firm* — Fujitsu Patent Center

(57) ABSTRACT

An arithmetic processing device includes arithmetic processing units, each having a calculator unit; a scheduler that controls a push instruction to write data to a register file in one of the arithmetic processing units and a pull instruction to read data from the register file; a pull request bus to which the scheduler outputs a pull request and which is connected to the arithmetic processing units; a push request bus to which the scheduler outputs a push request and which is connected to the arithmetic processing units; and a pull data bus that inputs, into the scheduler, pull data read from the register file in response to the pull request. Each of the arithmetic processing units includes a pull data turn-back bus that propagates pull data read from its register file to the pull data bus.

11 Claims, 11 Drawing Sheets

(56) References Cited

U.S. PATENT DOCUMENTS

| | | | | |
|---|---|---|---|---|
| 2009/0138570 A1* | 5/2009 | Miura | ................ | G06F 13/1673 |
| | | | | 709/217 |
| 2010/0023657 A1* | 1/2010 | Fukuda | ................ | G06F 13/161 |
| | | | | 710/37 |
| 2018/0285314 A1* | 10/2018 | Higeta | ................ | G06F 9/30032 |

* cited by examiner

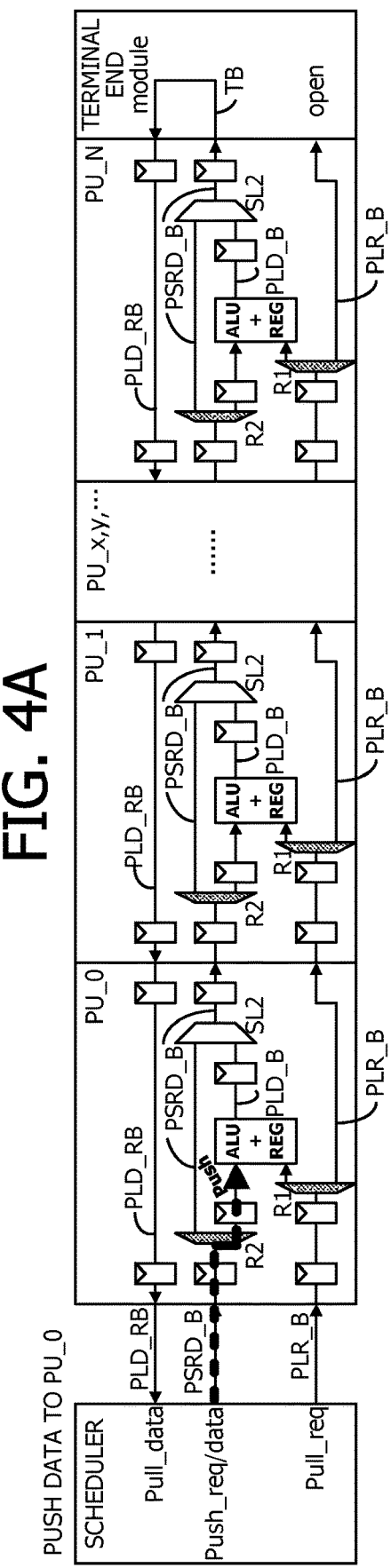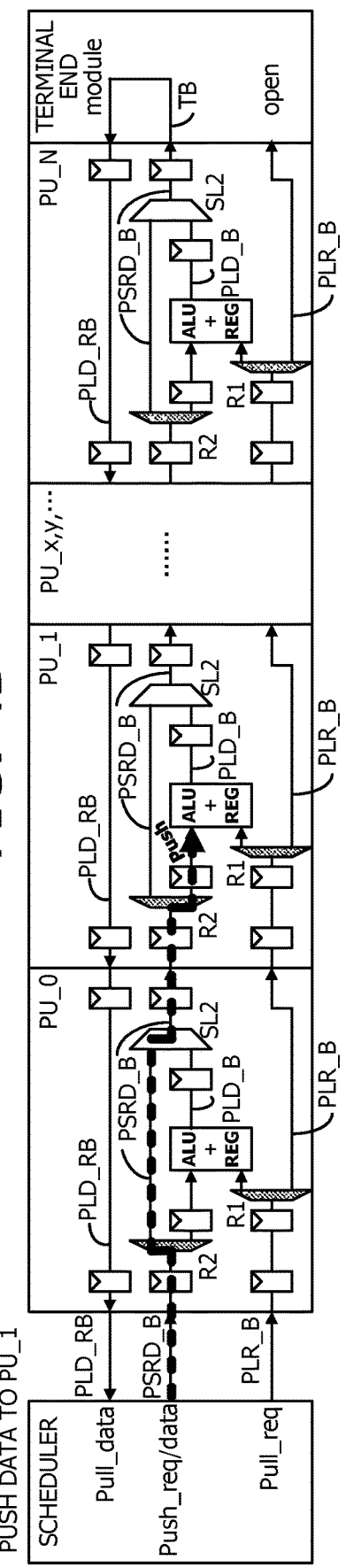

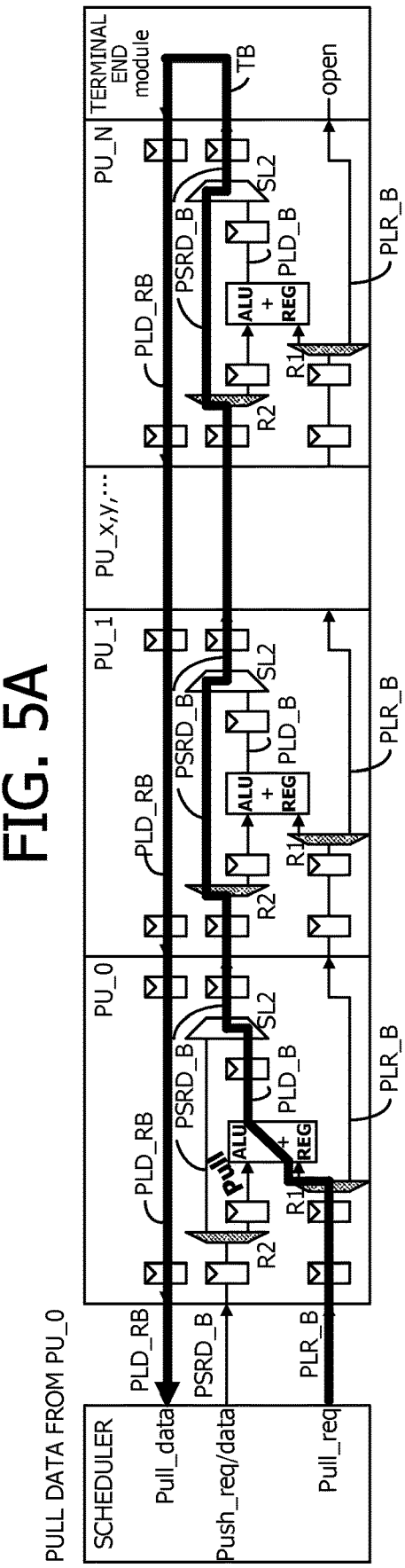
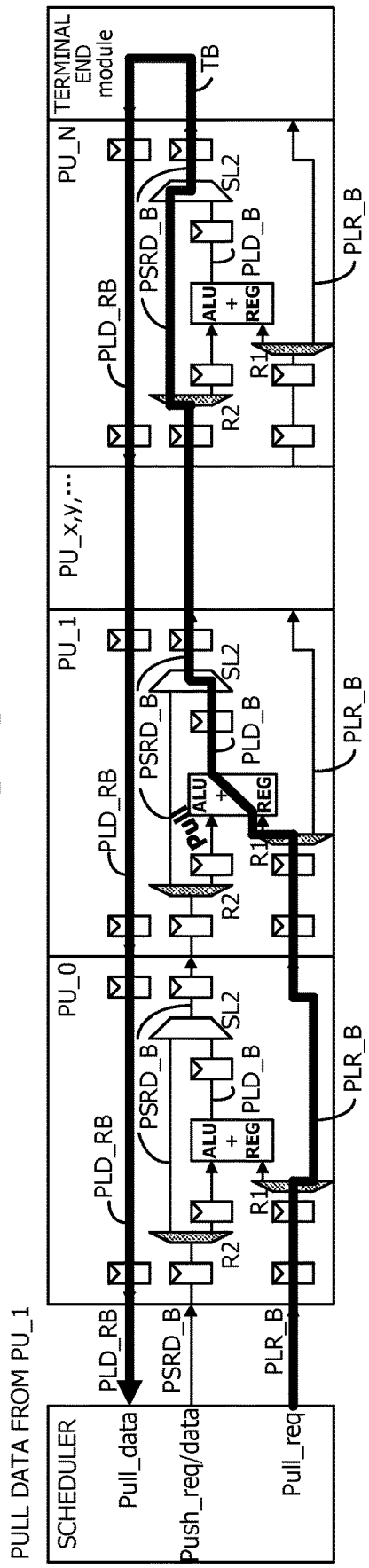
FIG. 5A
FIG. 5B

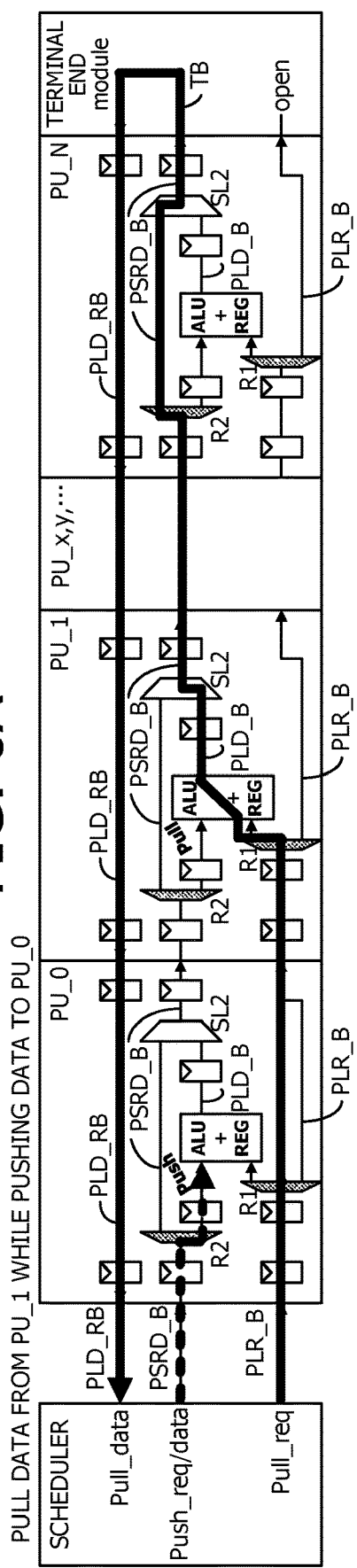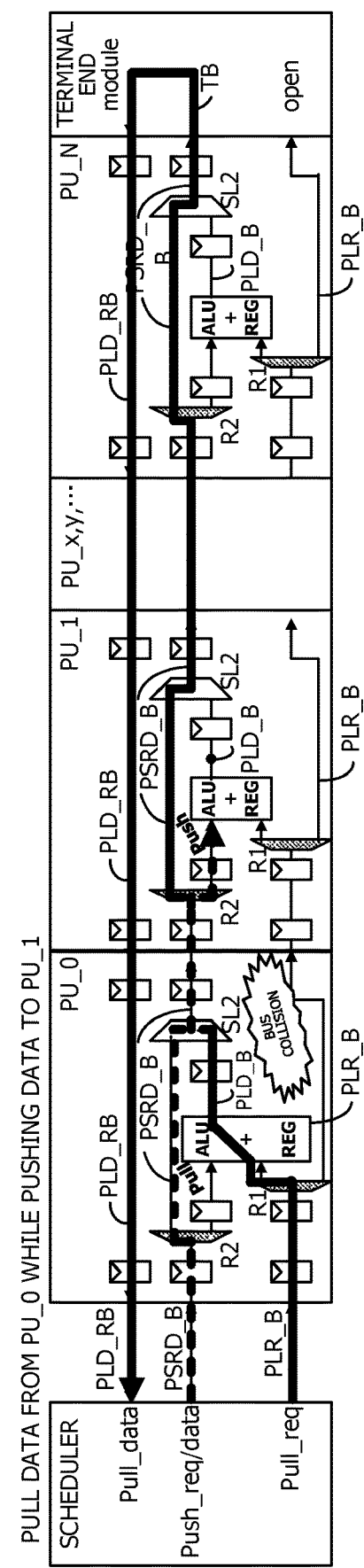

PULL DATA FROM PU_0 WHILE PUSHING DATA TO PU_1

FIG. 9

PUSH REQUEST Push_req

| OPCODE [N1:0] | RF_ADRS [N2:0] | LEN [N3:0] | CORE_ENBL [N4:0] | RF_ENBL [N5:0] |
|---|---|---|---|---|

PULL REQUEST Pull_req

| OPCODE [N1:0] | RF_ADRS [N2:0] | LEN [N3:0] | CORE_ENBL [N4:0] | RF_ENBL [N5:0] |
|---|---|---|---|---|

PULL & PUSH REQUEST PP_req

| OPCODE [N1:0] | RF_ADRS [N2:0] | T_CORE_ENBL [N3:0] | S_CORE_ENBL [N4:0] | RF_ENBL [N5:0] |
|---|---|---|---|---|

PUSH DATA AND PULL DATA data

| DATA [N6:0] |
|---|

OPCODE : REQUEST OPERATION CODE
RF_ADRS : SUBJECT REGISTER FILE ADDRESS
LEN : PACKET LENGTH
CORE_ENBL : SUBJECT CORE NUMBER
RF_ENBL : SUBJECT REGISTER FILE NUMBER
DATA : DATA

Register File

| RF_ADRS | RF_ENBL_00 | ... | RF_ENBL_N5 |
|---|---|---|---|
| | REG_0000 | | REG_0000 |
| | REG_0001 | | REG_0001 |
| | REG_0002 | ... | REG_0002 |
| | REG_2$^{N2+1}$ | | REG_2$^{N2+1}$ |

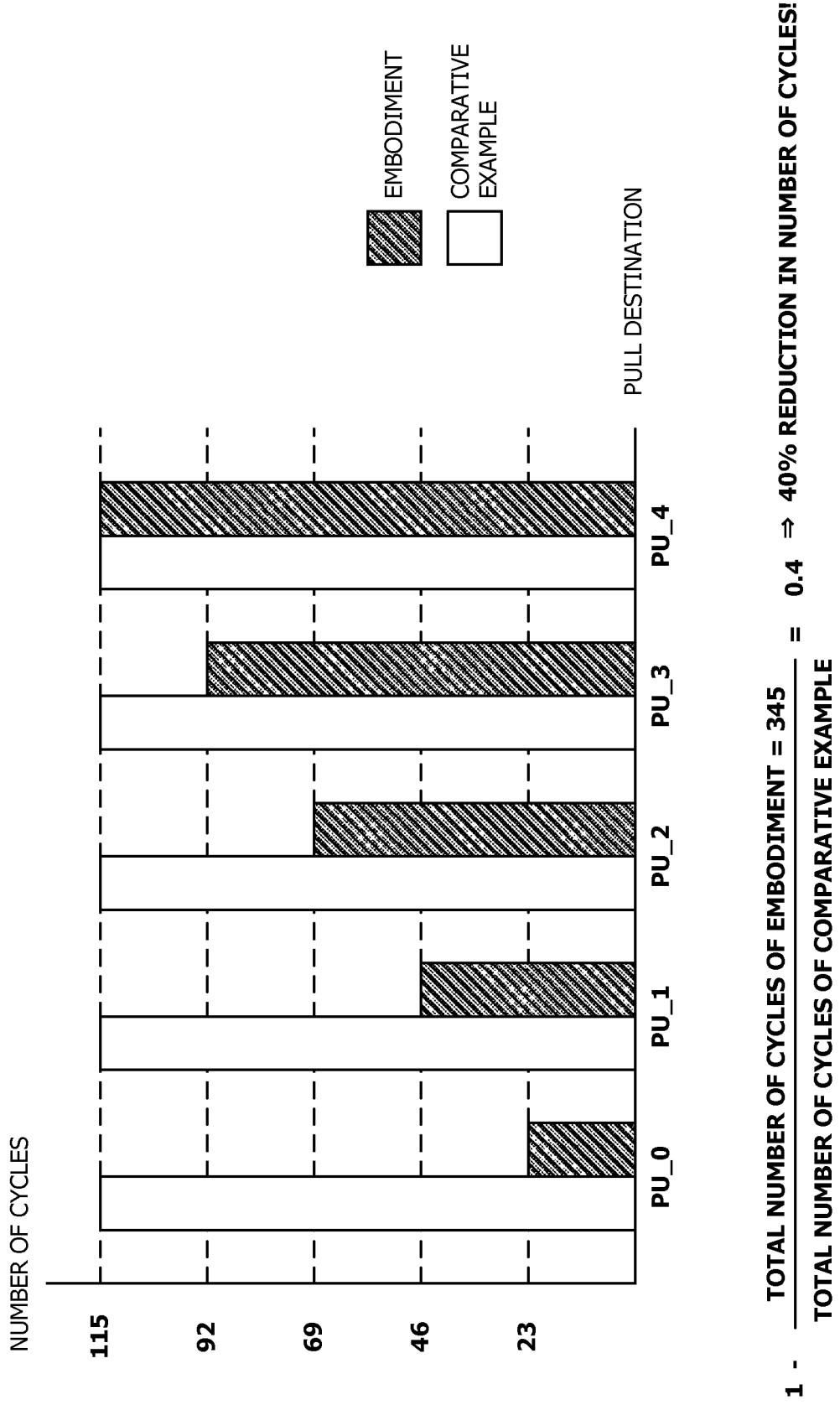

ARITHMETIC PROCESSING DEVICE HAVING MULTICORE RING BUS STRUCTURE WITH TURN-BACK BUS FOR HANDLING REGISTER FILE PUSH/PULL REQUESTS

CROSS-REFERENCE TO RELATED APPLICATION

This application is based upon and claims the benefit of priority of the prior Japanese Patent Application No. 2017-235211, filed on Dec. 7, 2017, the entire contents of which are incorporated herein by reference.

FIELD

The present invention relates to an arithmetic processing device and a control method for the arithmetic processing device.

BACKGROUND

An arithmetic processing device, also known as a processor, includes a plurality of arithmetic processing units (processor cores or simply cores, or core circuits) and a memory interface provided between the processor cores and a main memory. Each core includes an instruction control unit for decoding instructions and controlling execution of the instructions, and a calculator unit for executing calculation instructions. The processor is realized by an integrated circuit provided on a single semiconductor chip, for example.

A processor may include a large number of cores that execute special calculation instructions in parallel to implement arithmetic processing at high speed, in this type of processor, the large number of cores share a bus to the memory interface, and therefore, when the large number of cores execute memory access individually, bus traffic between the large number of cores and the memory interface increases. An increase also occurs in the amount of circuit resources of the bus wiring provided between the large number of cores and the memory interface.

Japanese National Publication of International Patent Application No. 2009-531746 and Japanese Laid-open Patent Publication No. 2001-92772 disclose a memory access configuration by a plurality of cores provided in a multicore processor access a memory.

SUMMARY

A processor having a large number of cores includes a ring bus, for example, for connecting the plurality of cores in a ring shape so as to reduce the amount of wiring needed by the bus and avoid a reduction in access throughput caused by an increase in traffic.

In a case where a plurality of cores are connected by a ring bus, however, when a push request for writing data to a register file in the calculator unit of a core and a pull request for reading data from the register file in the calculator unit of a core are issued simultaneously, the two requests may collide on the ring bus. To avoid this type of collision between two requests on the ring bus, issue timings of the two requests need to be appropriately shifted, with the result that a schedule for issuing requests becomes complicated. Moreover, as a result of the complicated request issuance schedule, data transfer throughput on the ring bus decreases.

An arithmetic processing device includes: a plurality of arithmetic processing units, each having a calculator unit that includes a calculator and a register file; a scheduler that is shared by the plurality of arithmetic processing units and controls a push instruction to write data to the register file in one of the plurality of arithmetic processing units and a pull instruction to read data from the register file; a pull request bus to which the scheduler outputs a pull request corresponding to the pull instruction, the pull request bus being connected to each of the plurality of arithmetic processing units; a push request bus to which the scheduler outputs a push request corresponding to the push instruction, the push request bus being connected to each of the plurality of arithmetic processing units; and a pull data bus that inputs, into the scheduler, pull data read from the register file in response to the pull request, the pull data bus being connected to each of the plurality of arithmetic processing units, each of the plurality of arithmetic processing units including: a first router that routes the pull request on the pull request bus to a home calculator unit; a second router that routes the push request on the push request bus to the home calculator unit; a pull data turn-back bus that propagates the pull data read from the register file of the home calculator unit to the pull data bus; and a first selector that selects an input of either the pull data turn-back bus or the pull data bus and outputs the selected input to the pull data bus.

According to the first aspect, collisions between requests on a ring bus are suppressed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B are views illustrating an example of a propagation path of a push request.

FIGS. 5A and 5B are views illustrating an example of a propagation path of a pull request and pull data.

FIGS. 6A and 6B are views illustrating an example of a propagation path in a case where a pull request and a push request are issued simultaneously.

FIG. 9 is a view illustrating formats of the requests and data and an example configuration of the register file, according to this embodiment.

FIG. 11 is a view illustrating numbers of clock cycles needed in each destination core circuit PU_0 to PU_4 to process a pull request, according to this embodiment and the comparative example.

DESCRIPTION OF EMBODIMENTS

Figure 1:
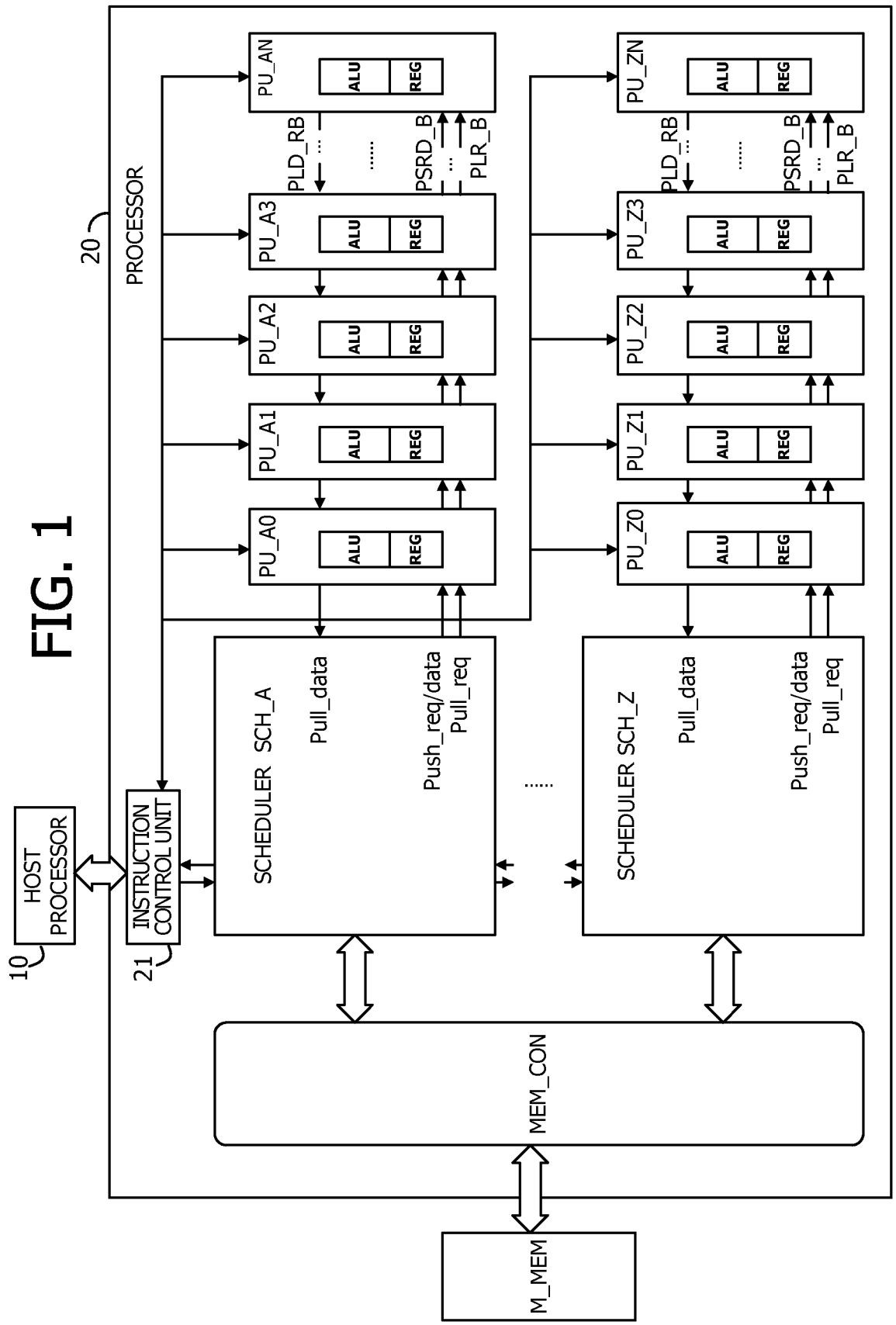
FIG. 1 is a view illustrating an example of a propagation path of a pull/push request.

FIG. 1 is a view illustrating a configuration of an arithmetic processing device (or a processor) according to an embodiment. A processor 20 is connected to a host processor 10 in order to receive requests for specific arithmetic processing from the host processor 10 and operate as an accelerator for executing the specific arithmetic processing.

To execute the specific arithmetic processing at high speed, the processor 20 includes a large number of processor cores (referred to as arithmetic processing units, core circuits, or cores) PU_A0-AN to PU_Z0-ZN. The plurality of core circuits are divided into a plurality of groups from an A group to a Z group, for example. A scheduler SCH_A to SCH_Z is provided respectively for the plurality of core circuits in each group. Note, however, that instead of dividing the plurality of core circuits into a plurality of groups, the plurality of core circuits may be grouped into a single group and provided with a single scheduler.

The processor also includes an instruction control unit 21 for receiving various instructions to execute the specific arithmetic processing from the host processor 10. The instruction control unit 21 issues memory access instructions for the respective core circuits to the plurality of schedulers, and issues calculation instructions to the plurality of core circuits.

The plurality of schedulers SCH_A to SCH_Z are connected to a memory controller MEM_CON that controls access to an external main memory M_MEM, and issue memory access requests (read requests, write requests, and so on) for accessing the main memory to the memory controller on behalf of the core circuits in the respective groups.

Further, three buses connected to the plurality of core circuits PU_A0-AN to PU_Z0-ZN in the respective groups are provided between the schedulers SCH_A to SCH_Z and the plurality of core circuits for each group. The three buses are a push request/data bus PSRD_B, a pull request bus PLR_B, and a pull data return bus (or a pull data bus) PLD_RB. Memory access processing by the plurality of core circuits PU_A0-AN to PU_Z0-ZN in each group is executed via these three buses.

Each of the schedulers SCH_A to SCH_Z performs request issuance control in relation to a pull request for reading data from a register file REG in a calculator unit (or arithmetic and logic unit) ALU in the core circuit PU, a push request for writing data to a register file, and so on. The scheduler outputs the pull request to the pull request bus PLR_B and receives data (pull data) read from the register file in the request destination core circuit from the pull data return bus PLD_RB.

Further, the scheduler outputs the push request to the push request/data bus (or push request bus) PSRD_B in order to write data to a register file in the request destination core circuit. Corresponding push data Push_data are issued at the same time as the push request Push_req.

As described above, the schedulers control data transfer between the pluralities of cores in the respective groups and the memory controller MEM_CON.

Furthermore, as described above, the pull request is executed on the request destination core circuit via the pull request bus PLR_B, to which the pull request Pull_req is output, and the pull data return bus PLD_RB that returns the pull data read from the register file in response to the pull request. In other words, a ring bus for connecting the scheduler to the plurality of core circuits in series in a ring shape is formed by the poll request bus and the pull data return bus.

Further, the push request is issued to the request destination core circuit via the push request/data bus PSRD_B to which the push request is output. Processing corresponding to the push request is completed when data are written to a register file of the request destination core circuit. Hence, the push request/data bus is a one-way bus connecting the scheduler to the plurality of core circuits in series.

As described above, three buses, namely the pull request bus PLR_B, the pull data return bus PLD_RB, and the push request/data bus PSRD_B, are provided in each core group between the scheduler and the plurality of core circuits. As a result, amounts of circuit resources and bus wiring for a memory access bus used by the large number of core circuits can be greatly suppressed.

Furthermore, each scheduler schedules and executes issuance of the pull requests and push requests for the plurality of core circuits, and also schedules and executes issuance of read requests and write requests to the memory controller MEM_CON. Thus, the single scheduler controls memory access processing for the plurality of core circuits. As a result, bus arbitration processing is simpler than in a case where a plurality of core circuits uses the memory access bus individually.

Figure 2:
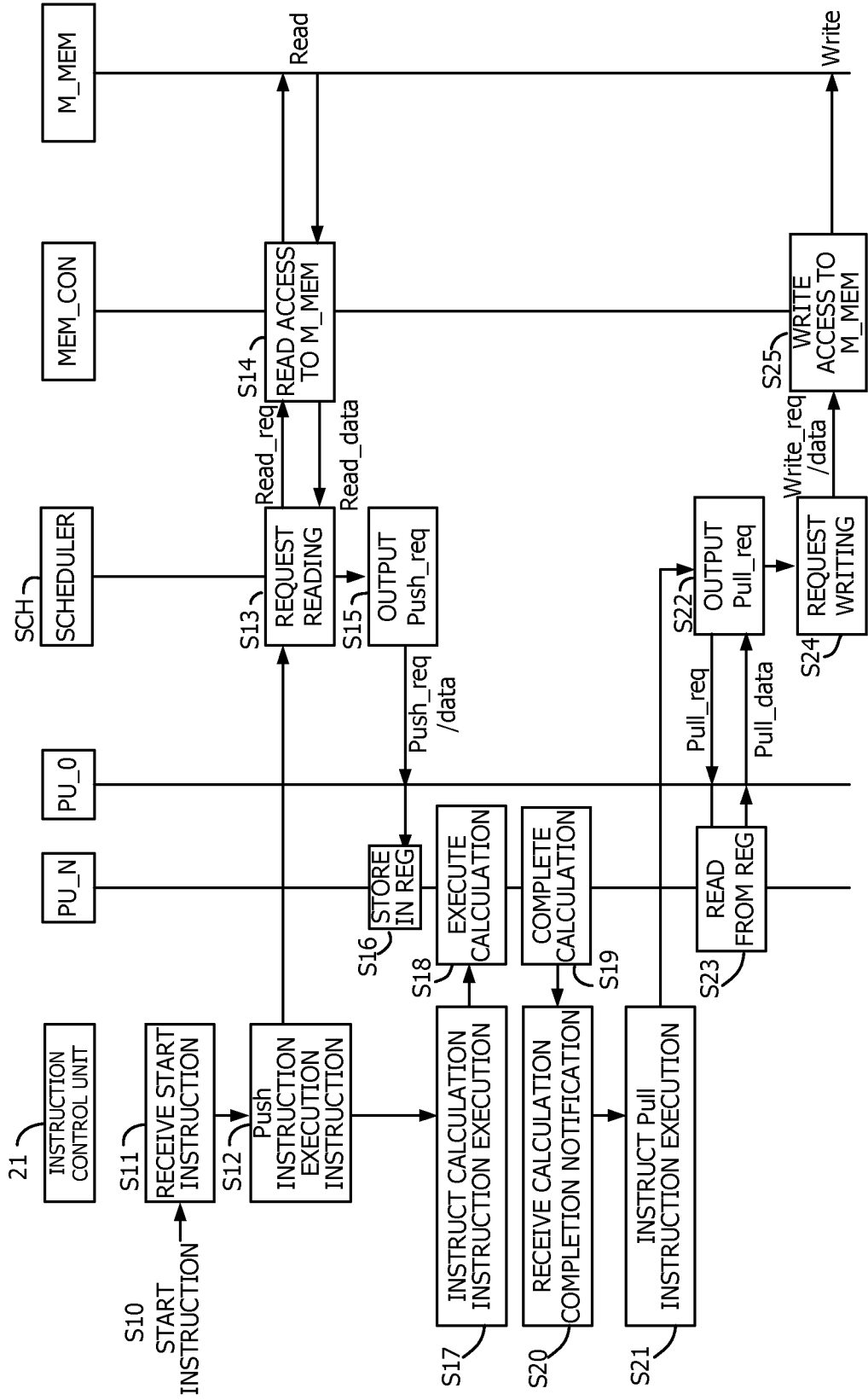
FIG. 2 is a flowchart illustrating examples of operations performed by the processor according to this embodiment in relation to a push instruction, a calculation instruction, and a pull instruction.

FIG. 2 is a flowchart illustrating examples of operations performed by the processor according to this embodiment in relation to a push instruction, a calculation instruction, and a pull instruction. FIG. 2 depicts one core group PU_0-PU_N and one scheduler SCH.

First, when the instruction control unit 21 receives a start instruction S10 to start predetermined arithmetic processing from the host processor (S11), the instruction control unit 21 transmits an instruction to execute a push instruction to the scheduler SCH (S12). The arithmetic processing is generally constituted by reading an instruction or data from the main memory, executing the instruction, and writing a calculation result to the main memory.

In response to the instructing the push instruction, the scheduler SCH issues a read request Read_req to the memory controller MEM_CON (S13), whereupon the memory controller obtains data by read-accessing the main memory and returns the read data Read_data to the scheduler SCH (S14).

The scheduler SCH then outputs a push request Push_req to the push request/data bus PSRD_B together with the read data (S15). The push request is addressed to a register file in the core circuit PU_N, for example. In this case, the push request propagates along the push request/data bus from the core circuit: PU_0, whereupon the calculator unit of the destination core circuit PU_N writes the data in the push request to the register file (S16).

Subsequent to the aforesaid push instruction execution instruction S12, the instruction control unit 21 transmits a calculation instruction execution instruction to the core circuit PU_N (S17). In response thereto, the core circuit PU_N executes arithmetic processing on the data written to the register file (S18), and when the calculation is complete, transmits a calculation completion notification to the instruction control unit 21 (S19, S20).

Next, the instruction control unit 21 transmits an instruction to execute a pull instruction to the scheduler SCH (S21). In response to the pull instruction execution instruction, the scheduler SCH outputs a pull request Pull_req addressed to the core circuit PU_N to the pull request bus PLR_B (S22). The pull request propagates along the pull request bus PLR_B, whereupon the calculator unit of the destination core circuit PU_N reads the data from the register file in response to the pull request and returns the pull data to the pull data return bus PLD_RB (S23). The scheduler SCH then outputs a write request Write_req/data for writing the pull data to the main memory to the memory controller MEM_CON (S24). In response thereto, the memory controller MEM_CON write-accesses the main memory and writes the pull data to the main memory M_MEM (S25).

From the above description, an outline of the data transfer control performed by the scheduler SCH between the core circuit and the memory controller is ascertained.

COMPARATIVE EXAMPLE OF PROCESSOR

Next, before describing the processor according to this embodiment, a comparative example thereof will be described. The following comparative example is not necessarily known.

Figure 3:
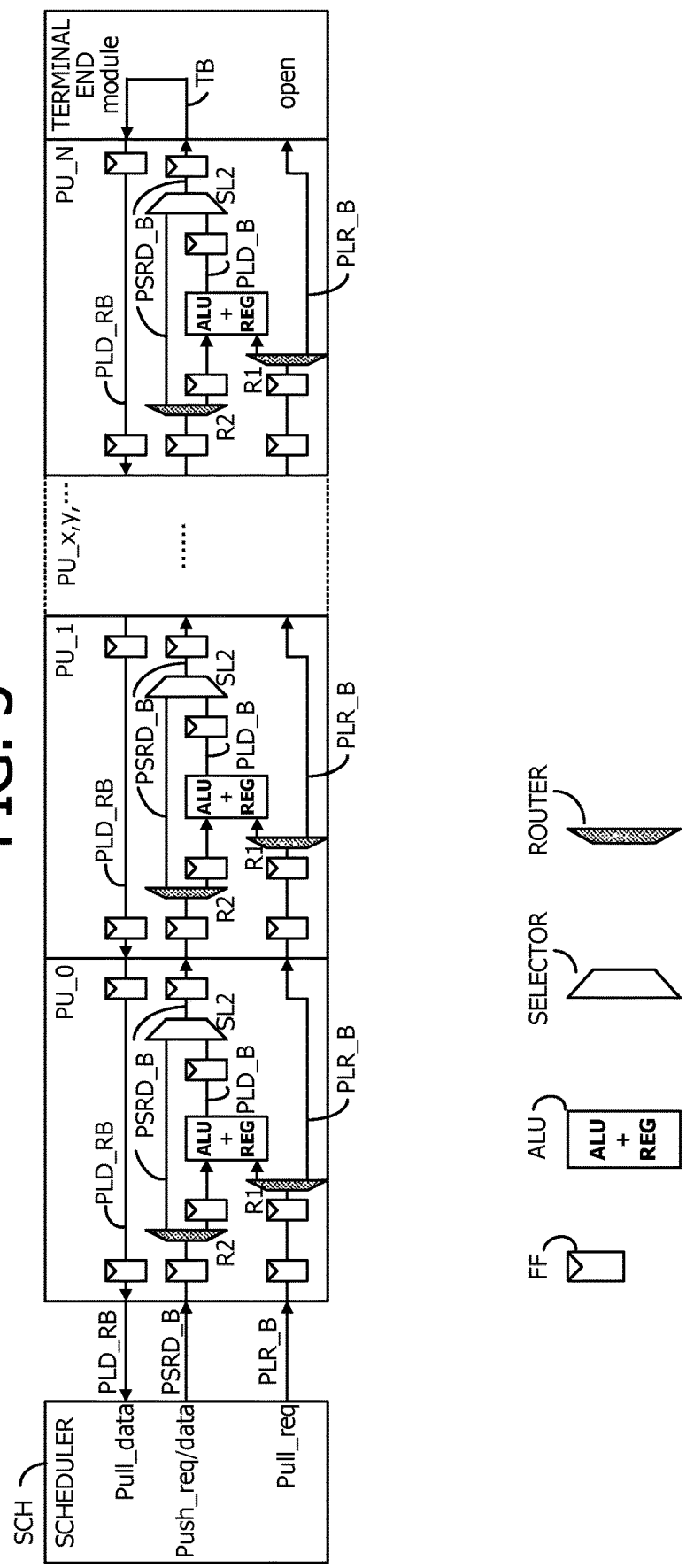
FIG. 3 is a view illustrating a scheduler and a core group of core circuits provided in a processor according to a comparative example.

FIG. 3 is a view illustrating a scheduler and a core group of core circuits provided in a processor according to a comparative example. FIG. 3 depicts the scheduler SCH and a core group constituted by a plurality of core circuits PU_0 to PU_N. Similarly to FIG. 1, the pull request bus PLR_B to which the pull request Pull_req is output, the pull data return bus PLD_RB to which the pull data Pull_data are returned, and the push request/data bus PSRD_B to which the push request Push_req and data are output are connected to the scheduler SCH. The pull request bus, the pull data return bus, and the push request/data bus are each connected to the plurality of core circuits PU_0 to PU_N so that pull requests, pull data, and push requests together with the data therein propagate respectively along the buses.

Each core circuit includes a calculator unit ALU+REG having a calculator and a register file. The register file is a type of random access memory (RAM). Each core circuit includes a first router R1 for routing a pull request signal on the pull request bus PLR_B to the home calculator unit ALU+REG, and a second router R2 for routing a push request signal on the push request/data bus PSRD_B to the home calculator unit ALU+REG. Further, each core circuit includes a pull data bus PLD_B to which pull data read by the calculator unit ALU+REG are output, and a second selector SL2 for selecting the input of either the pull data bus PLD_B or the push request/data bus PSRD_B and outputting the selected input to the push request/data bus PSRD_B of a subsequent stage.

The pull request signal and the push request signal include an identifier of the core circuit to perform the reading and an identifier of the core circuit to perform the writing, respectively, and on the basis of these identifiers, the first router R1 and the second router R2 in each core circuit route the pull request signal and the push request signal to the home calculator unit ALU+REG.

A terminal end module 30 is connected to the final stage core circuit PU_N that is furthest from the scheduler. The terminal end module 30 includes a turn-back bus TB connecting the push request/data bus PSRD_B and the pull data return bus PLD_RB, while the pull request bus PLR_B is left open-ended.

Further, each core circuit is provided with a plurality of flip-flops FF inserted into the push request/data bus PSRD_B, the pull request bus PLR_B, the pull data return bus PLD_RB, and the pull data bus PLD_B. The flip-flops FF are latch circuits forming pipeline stages of the respective buses.

FIGS. 4A and 4B are views illustrating an example of a propagation path of a push request. A thick line in FIG. 4A illustrates a propagation path in a case where the scheduler SCH issues a push request for writing data to the register file REG in the calculator unit ALU+REG of the core circuit PU_0. The scheduler SCH outputs the push request Push_req to the push request/data bus PSRD_B together with data. The push request propagating along the push request/data bus is routed to the calculator unit ALU+REG by the second router R2 of the core circuit PU_0, whereupon the calculator unit ALU writes the data in the push request to a register in the write destination register file REC.

A thick line in FIG. 4B illustrates a propagation path in a case where the scheduler SCH issues a push request for writing data to the register file REG of the calculator unit ALU+REG in the core circuit PU_1. In this case, the push request output by the scheduler so as to propagate along the push request/data bus is routed to the push request/data bus PSRD_B side by the second router R2 of the core circuit PU_0 so as to bypass the core circuit PU_0, and then routed to the calculator unit ALU+REG by the second router R2 of the core circuit PU_1. The calculator unit ALU+REG then writes the data in the push request to a register in the write destination register file.

As described above, the scheduler SCH output a push request to one of the plurality of core circuits PU_0 to PU_N via the shared push request/data bus PSRD_B. As regards scheduling, therefore, the scheduler SCH can simply output a plurality of push requests consecutively to the pipeline circuit of the push request/data bus.

FIGS. 5A and 5B are views illustrating an example of a propagation path of a pull request and pull data. A thick One in FIG. 5A illustrates a propagation path of a pull request and pull data in a case where the scheduler SCH issues a pull request for reading data from the register file of the calculator unit ALU+REG in the core circuit PU_0. The pull request signal issued by the scheduler propagates along the pull request bus PLR_B and is routed to the calculator unit ALU+REG by the first router R1 of the core circuit PU_0, whereupon data are read from the register file. The read pull data propagate along the pull data bus PLD_B of the core circuit PU_0 and then propagate along the push request/data bus PSRD_B via the second selector SL2 so as to bypass the core circuits PU_1 to PU_N. The pull data then propagate along the pull data return bus PLD_RB via the turn-back bus TB of the terminal end module, and are input into the scheduler SCH.

A thick line in FIG. 5B illustrates a propagation path of a pull request and pull data in a case where the scheduler SCH issues a pull request for reading data from the register file in the core circuit PU_1. The pull request signal issued by the scheduler propagates along the pull request bus PLR_B and is routed to the calculator unit ALU+REG by the first router R1 of the core circuit PU_1, whereupon data are read from the register file in the calculator unit ALU+REG. The read pull data propagate along the pull data bus PLD_B of the core circuit PU_1 and then propagate along the push request/data bus PSRD_B via the second selector SL2 so as to bypass the core circuits PU_2 to PU_N. The pull data then propagate along the pull data return bus PLD_RB via the turn-back bus TB of the terminal end module, and are input into the scheduler SCH.

As described above, the scheduler SCH output a pull request to any of the plurality of core circuits PU_0 to PU_N via the shared pull request bus PLR_B. As regards scheduling, therefore, the scheduler SCH simply output a plurality of pull requests consecutively to the pipeline circuit of the pull request bus.

Propagation along both the pull request bus PLR_B and the push request/data bus PSRD_B in the core circuit is performed by synchronizing the flip-Hops provided in the two buses with a clock so that the latency of the two buses in the core circuit is fixed. Hence, the scheduler SCH can issue a plurality of pull requests Pull_req sequentially in synchronization with the dock, making scheduling simple.

The performance of a multicore processor mainly depends on the throughput of data transfer to and from the memory. It is therefore important to ensure that as many pull request signals and push request signals as possible propagate along the pull request bus and the push request/data bus between the scheduler SCH and the core circuits. To improve the throughput of the pull request bus and the push request/data bus, the scheduler SCH is preferably also allowed to issue a pull request signal and a push request signal simultaneously.

FIGS. 6A and 6B are views illustrating an example of a propagation path in a case where a pull request and a push request are issued simultaneously. FIG. 6A illustrates propagation of a push request issued to the core circuit PU_0 and a pull request issued to the core circuit PU_1 in a case where the scheduler SCH issues the two requests simultaneously. This example corresponds to a case in which FIG. 4A and FIG. 5B are executed simultaneously. In this case, the push request signal is routed by the second router R2 of the core circuit PU_0 to the calculator unit ALU+REG, whereupon the push data are written to the register file thereof. Meanwhile, the pull request signal bypasses the core circuit PU_0 and is routed by the first router R1 of the core circuit PU_1 to the calculator unit ALU+REG, whereupon pull data read from the register file propagate along the push request/data bus PSRD_B via the second selector SL2 of the core circuit PU_1 and then propagate along the push request/data bus PSRD_RB. As a result, the push request signal does not collide with the pull request signal and pull data.

FIG. 6B, meanwhile, illustrates propagation of a push request issued to the core circuit PU_1 and a pull request issued to the core circuit PU_0 in a case where the scheduler SCH issues the two requests simultaneously. This example corresponds to a case in which FIG. 4B and FIG. 5A are executed simultaneously. In this case, the pull request signal is routed by the first router R1 of the core circuit PU_0 to the calculator unit ALU+REG, whereupon a read pull data signal is input into the second selector SL2 via the pull data bus PLD_B. Meanwhile, the push request signal bypasses the core circuit PU_0 and is routed by the second router R2 of the core circuit PU_1 to the calculator unit ALU+REG, whereby the push request signal is input into the second selector SL2 of the core circuit PU_1.

As a result, the push request signal and the pull data signal are input into the second selector SL2 of the core circuit PU_0 simultaneously, and therefore collide either in the second selector SL2 or the push request/data bus PSRD_B connected to the output of the second selector SL2. The reason for this, as described above, is that the push request/data bus and the pull request bus are synchronized with the clock, and therefore propagate through the core circuit PU_0 with the same latency.

To avoid the collision described above between the push request signal and the pull data signal, the scheduler SCH may issue either the push request signal or the pull request signal at a delay of a predetermined number of clock cycles. When scheduling is performed in this manner, however, the throughput of the push request/data bus and the pull request bus deteriorates.

Processor According to this Embodiment

Figure 7A:
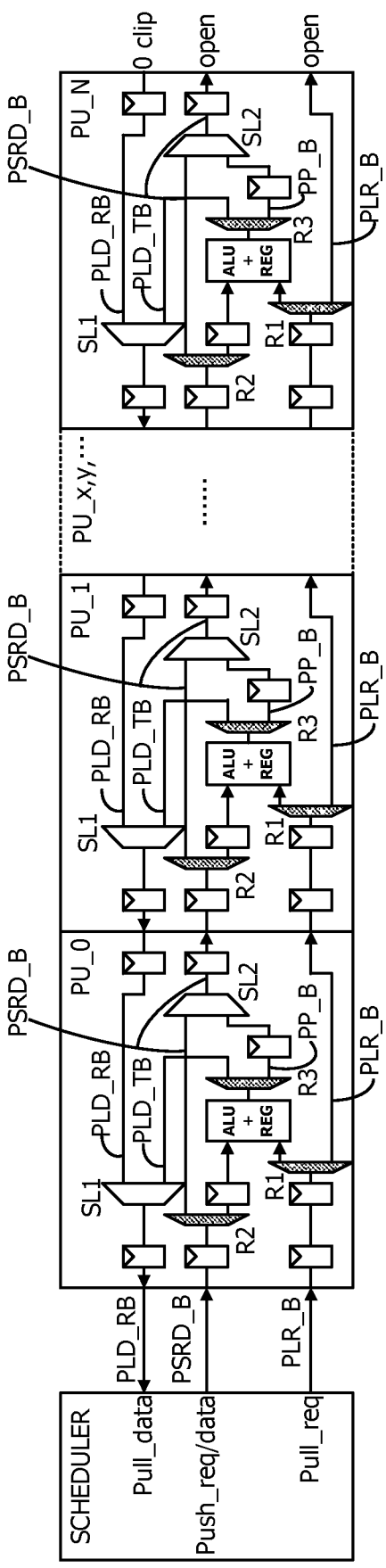
FIGS. 7A and 7B are views illustrating an example configuration of the scheduler and the group including the plurality of core circuits in the processor according to this embodiment.
Figure 7B:
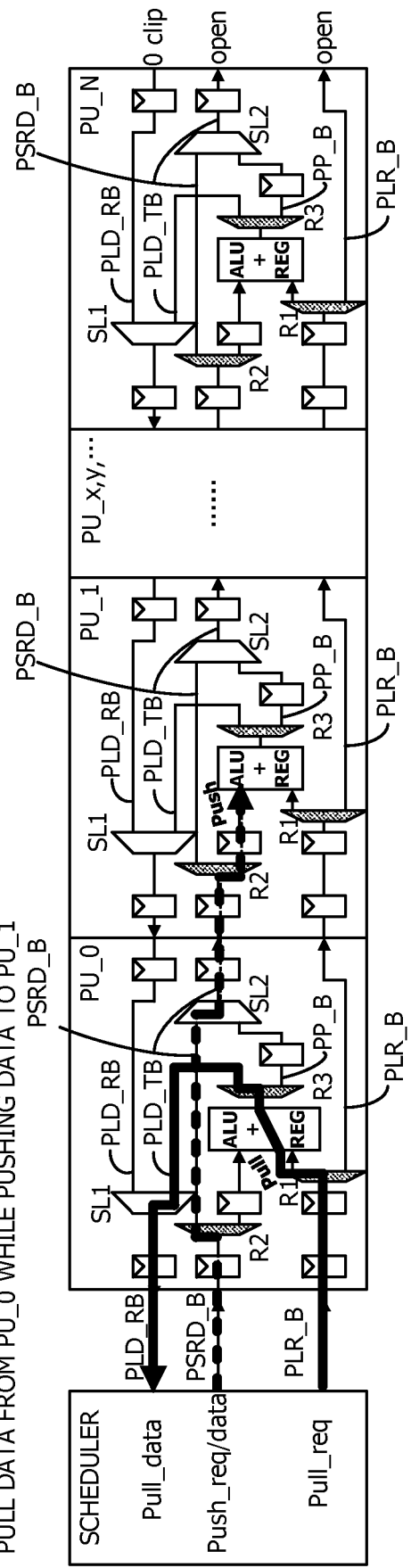

FIGS. 7A and 7B are views illustrating an example configuration of the scheduler and the group including the plurality of core circuits in the processor according to this embodiment. Similarly to FIG. 3, in the configuration illustrated in FIG. 7A, the pull request bus PLR_B to which the pull request Pull_req is output, the pull data return bus PLD_RB into which the pull data Pull_data are input, and the push request/data bus PSRD_B to which the push request Push_req and data are output are connected to the scheduler SCH. The pull request bus, the pull data return bus, and the push request/data bus are connected to each of the plurality of core circuits PU_0 to PU_N so that pull requests, pull data, and push requests together with the data therein propagate respectively along the buses.

Each core circuit includes the calculator unit ALU+REG having a calculator and a register file. Each core circuit also includes the first router R1 for routing a pull request signal on the pull request bus PLR_B to the home calculator unit ALU+REG, and the second router R2 for routing a push request signal on the push request/data bus PSRD_B to the home calculator unit ALU+REG. Up to this point, the processor is configured identically to that of FIG. 3.

In this embodiment, each core circuit further includes a pull/push bus PP_B to which pull data read from the register file REG are output, and a second selector SL2 for selecting the input of either the pull/push bus PP_B or the push request/data bus PSRD_B and outputting the selected input to the push request/data bus PSRD_B of a subsequent stage. Note that the pull/push bus PP_B and the second selector SL2 correspond respectively to the pull data bus PLD_B and the second selector SL2 of the processor illustrated in FIG. 3.

In the processor according to this embodiment, each core circuit is provided with a pull data turn-back bus PLD_TB for propagating pull data read from the home register file REG to the pull data return bus PLD_RB. Further, each core circuit is provided with a first selector SL1 for selecting the input of either the pull data turn-back bus PLD_TB or the pull data return bus PLD_RB and outputting the selected input to the pull data return bus PLD_RB.

Furthermore, in the processor according to this embodiment, a third router R3 for routing pull data pulled in response to a pull request to the pull data turn-back bus PLD_TB and routing a pull/push request, to be described below, and pull data to the pull/push bus PP_B is provided in each core circuit. The third router R3 is needed to issue the push/pull request, to be described below.

As described above, the pull data turn-back bus PLD_TB and the first selector SL1 are provided in each core circuit so that pull data read from the home register fife of the core circuit are propagated to the pull data return bus PLD_RB in the core circuit instead of being propagated to the push request/data bus PSRD_B of a subsequent stage. Hence, the turn-back bus TB of the terminal end module is not connected to the final stage core circuit PU_N, and therefore the push request/data bus PSRD_B is open-ended while the pull data return bus PLD_RB is dipped to a low level (0 level). Similarly to FIG. 3, the pull request bus PLR_B is also open-ended.

FIG. 7B illustrates propagation of a push request issued to the core circuit PU_1 and a pull request issued to the core circuit PU_0 in a case where the scheduler SCH issues the two requests simultaneously. In this case, according to this embodiment, the pull request signal Pull_req is routed by the first router R1 of the core circuit PU_0 to the calculator unit ALU+REG, whereupon a read pull data signal is routed by the third router R3 to the pull data turn-back bus PLD_TB and input into the first selector SL1. The read pull data signal then propagates along the pull data return bus PLD_RB via the first selector SL1 so as to be input into the scheduler SCH.

Meanwhile, the push request signal Push_req/data is routed by the second router R2 of the core circuit PU_0 to the push request/data bus PSRD_B so as to bypass the core circuit PU_0, and then passes through the second selector SL2 so as to be routed by the second router R2 of the core circuit PU_1 to the calculator unit ALU+REG. Hence, the push request signal and the pull data signal read from the register file in the core circuit PU_0 do not physically collide at the input of the second selector SL2. In other words, the scheduler SCH can issue a push request signal and a pull request signal either simultaneously or at desired timings without taking into consideration collision between the two signals on the second selector and the push request/data bus PSRD_B at the output thereof.

Note, however, that since the first selector SL1 is provided in the pull data return bus PLD_RB, pull data pulled in response to pull requests issued at separate timings may compete in the first selector SL1 of one of the core circuits. In this case, the scheduler SCH simply adjusts the respective issue timings of the pull requests and does not have to adjust the issue timings of a pull request and a push request.

As described above, the latencies of the core circuits are all identical. Hence, the latency in each destination core circuit with respect to a pull request can be predicted, and therefore the scheduler can avoid collision by adjusting the issuance schedule of the pull request bus on the basis of the predicted latency. As a result, scheduling can be performed comparatively easily.

Figure 8A:
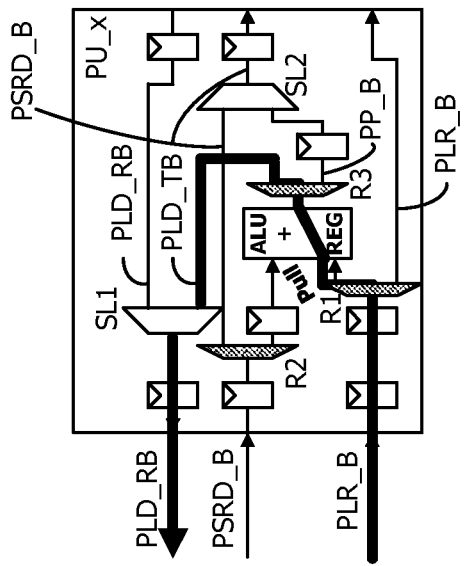
FIGS. 8A and 8B are views illustrating propagation of a pull request signal and a pull data signal.
Figure 8B:
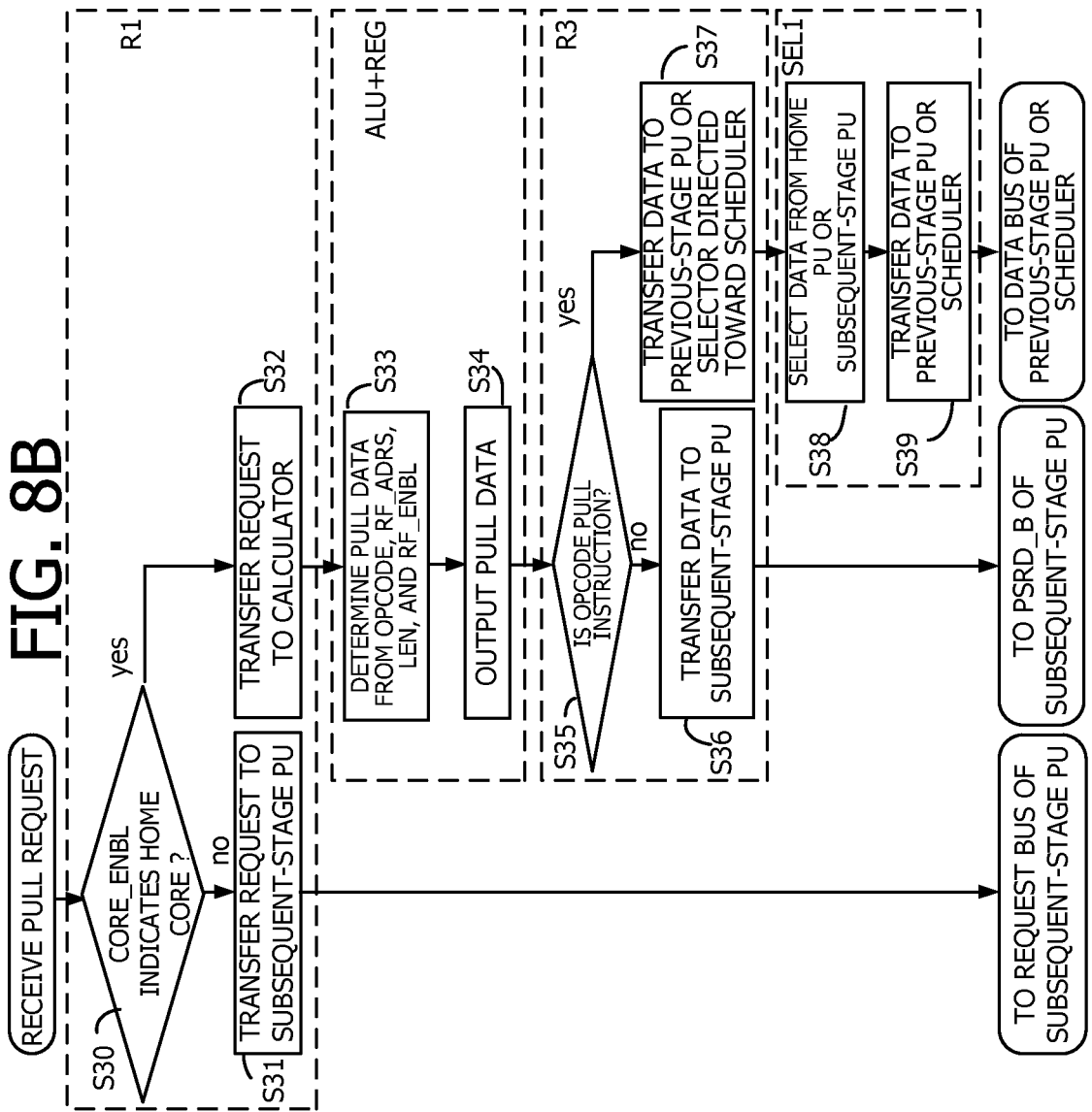

FIGS. 8A and 8B are views illustrating propagation of a pull request signal and a pull data signal. FIG. 8A depicts the propagation paths of a pull request signal and a pull data signal in a pull request destination core circuit PU_x, and FIG. 8B depicts a flowchart illustrating operations of the first router R1, the calculator unit ALU+REG, the third router R3, and the first selector SL1 of the core circuit PU_x.

FIG. 9 is a view illustrating formats of the requests and data and an example configuration of the register file, according to this embodiment. The flowchart depicted in FIG. 8 will be described after describing FIG. 9.

The format of the push request Push_req includes N1+1 bits of operation code OPCODE, an N2+1 bits register file address RF_ADRS, an N3+1 bits data length LEN, an N4+1 bits core identifier CORE_ENBL, and an N5+1 bits register file identifier RF_ENBL.

The format of the pull request Pull_req likewise includes N1+1 bits of operation code OPCODE, an N2+1 bits register file address RF_ADRS, an N3+1 bits data length LEN, an N4+1 bits core identifier CORE_ENBL, and an N5+1 bits register file identifier RF_ENBL.

The format of a pull/push request PP_req includes N1+1 bits of operation code OPCODE, an N2+1 bits register file address RF_ADRS, an N3+1 bits target core identifier T_CORE_ENBL, an N4+1 bits source core identifier S_CORE_ENBL, and an N5+1 bits register file identifier RF_ENBL. The source core is the read destination core circuit of the pull/push request, and the target core is the write destination core circuit of the pull/push request. In other words, the pull/push request is a request for reading data from the register file of a certain core circuit and writing the read data to the register file of an adjacent or subsequent-stage core circuit.

The format of the push data and pull data includes Nb+1 bits of data DATA. The number of bits is a volume corresponding to an integral multiple of the amount of data that can be written to a single register, for example. Hence, data of a volume specified by the data length LEN of the pull request or push request are stored in the push data and pull data.

The aforementioned operation code OPCODE denotes an instruction relating to a push request, a pull request, or another request such as a pull/push request. The register file address RF_ADRS is an address specifying a register in the register file, which is constituted by a RAM or the like. The data length LEN is the length of the data requested by a pull request or the length of the data to be written in response to a push request. The data length indicates the amount of data in the push data or pull data that is propagated subsequent to a push request or pull request. The core identifier CORE_ENBL is a core number indicating one of the plurality of core circuits. Further, the register file identifier RF_ENBL is a register file number identifying one of a plurality of register files provided in a calculator ALU.

In the N4+1 bite core identifier CORE_ENBL, the bit corresponding to the request destination core circuit, among N4+1 core circuits, is set at "1". For example, when data are to be transferred by broadcast to the register files of all core circuits in response to a push request, all bits are set at "1". Further, when data are to be transferred to the register files of some core circuits, the bits corresponding to these core circuits are set at "1".

The register files REG in each calculator include N5+1 register files RF_ENBL_00 to RF_ENBL_N5, i.e. the same number of register files as the number of bits N5+1 constituting the register file identifier RF_ENBL. Each register file includes $2^{N2+1}$ register files that corresponds to the power ($2^{N2+1}$) of the number of bits N2+1 of the register file address RF_ADRS. Hence, the register file serving as the destination of a pull request or a push request is specified by the register file identifier RF_ENBL and the register file address RF_ADRS.

The push request signal and the push data signal are output in series to the push request/data bus PSRD_B. Further, the poll request signal is output to the pull request bus PLR_B. The pull data read from the register file REG are output to the pull data turn-back bus PLD_TB subsequent to the pull request signal. Further, the read pull data are output to the pull data return bus PLD_RB by the first selector SL1 subsequent to the pull request signal.

As described above, the push request Push_req and the push data are output to the push request/data bus PSRD_B in series, and therefore the push request/data bus PSRD_B has a bus width corresponding to whichever of the push request and the push data has the larger number of bits. The pull request bus PLR_B has a bus width corresponding to the number of bits of the pull request. The pull request and the pull data are output to the pull data turn-back bus PLD_TB and the pull data return bus PLD_RB in series, and therefore the pull data turn-back bus PLD_TB and the pull data return bus PLD_RB have a bus width corresponding to whichever of the pull request and the pull data has the larger number of bits.

Returning to FIG. 8, control implemented in the core circuit with respect to a pull request will now be described. When a pull request signal Pull_req for reading the data in the core circuit PU_x is output to the pull request bus PLR_B by the scheduler SCH, the first router R1 of the core circuit PU_x determines whether or not the core identifier CORE_ENBL in the pull request indicates the home core circuit, and obtains YES as a determination result (YES in S30). On the basis of the determination result, the first router R1 routes the pull request signal to the home calculator unit ALU+REG (S32). When the home core circuit is not indicated (NO in S30), the first router R1 routes the pull request signal to the pull request bus PLR_B in order to transfer the pull request signal to a subsequent-stage core circuit (S31).

Next, the calculator ALU in the core circuit PU_x determines the register to be read by the pull request on the basis of the operation code OPCODE, register file address RF_ADRS, data length LEN, and register file identifier RF_ENBL thereof (S33). The calculator ALU then reads and outputs the data in the determined register (S34). The read data are stored in the pull data format and output subsequent to the pull request signal.

Next, the third router R3 determines whether or not the operation code of the request signal indicates a Pull instruction (S35), and when the operation code indicates a Pull instruction (YES in S35), routes the pull request signal and the pull data to the pull data turn-back bus PLD_TB in order to transfer the pull request signal and pull data to the first selector SL1 (S37). When the operation code does not indicate a Pull instruction (NO in S35), the third router R3 transfers the request signal and the pull data signal in series to the pull/push bus PP_B (S36).

Finally, the first selector SL1 selects the input of either the pull data turn-back bus PLD_TB of the home core circuit or the pull data return bus PLD_RB from the subsequent-stage core circuit (S38) and outputs the pull request signal and the pull data consecutively to the pull data return bus PLD_RB (S39). As a result, the pull request signal and the pull data are transferred to either a previous-stage core circuit or the scheduler SCH.

Pull/Push Request

Figure 10:
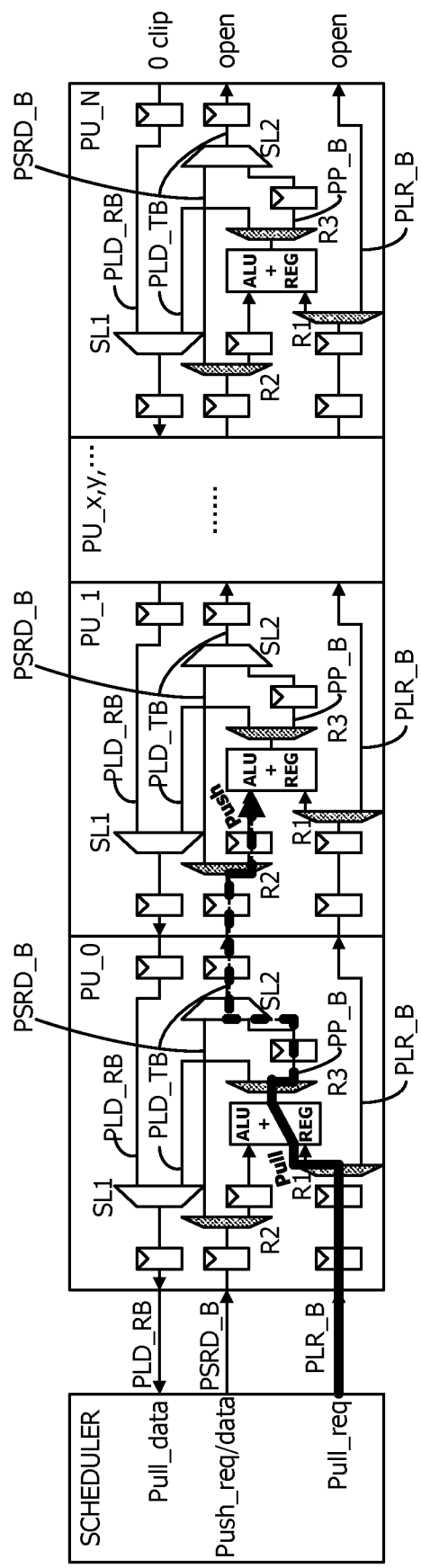
FIG. 10 is a view illustrating an example of a propagation path of a pull/push request.

FIG. 10 is a view illustrating an example of a propagation path of a pull/push request. The scheduler SCH outputs a pull/push request signal to the pull request bus PLR_B. As illustrated in FIG. 9, the pull/push request signal includes a target core number T_CORE_ENBL and a source core number S_CORE_ENBL. It is assumed here that the target core is PU_1 and the source core is PU_0.

The first router R1 of the core circuit PU_0 detects that the source core number of the request signal indicates the home core circuit PU_0, and therefore routes the request signal to the home calculator unit ALU+REG. The calculator ALU specifies the read destination register in the register file on the basis of the register file identifier RF_ENBL and the register file address RF_ADRS in the request signal, and outputs the data in the read destination register.

Next, the third router R3 routes the request signal and a pull data signal to the pull/push bus PP_B on the basis of the fact that the operation code of the request signal indicates a pull/push instruction. The second selector SL2 then outputs the request signal and the pull data signal to the push request/data bus PSRD_B.

Next, the second router R2 in the core circuit PU_1 routes the request signal and the pull data signal to the home calculator unit ALU+REG on the basis of the fact that the target core identifier T_CORE_ENBL of the request signal indicates the home core number. The calculator ALU then writes the pull data to the write destination register in the register file on the basis of the register file identifier RF_ENBL and the register file address RF_ADRS in the request signal.

FIG. 11 is a view illustrating numbers of clock cycles needed in each destination core circuit PU_0 to PU_4 to process a pull request, according to this embodiment and the comparative example. Estimates have been made on the assumption that the number of clock cycles in the calculator unit ALU+REG of each core circuit is twenty, the number of cycles outside the calculator unit is three, and the number of core circuits is five.

According to this embodiment, when the destination core circuit is PU_0, the number of cycles needed to process a pull request is twenty-three, whereas in the comparative example, the pull data are returned through the five core circuits, and therefore the number of cycles needed to process a pull request is 23×5=115. Similarly, when the destination core circuit is PU_1, the number of cycles needed to process a pull request is 23×2=46 according to this embodiment but 115 in the comparative example, and this applies likewise thereafter, as follows.

When the destination core circuit, is PU_2, 23×3=69 according to this embodiment and 115 in the comparative example.

When the destination core circuit is PU_3, 23×4=92 according to this embodiment and 115 in the comparative example.

When the destination core circuit is PU_4, 23×5=115 according to this embodiment and 115 in the comparative example.

Hence, the number of cycles needed to process a pull request in all of the core circuits is 345 according to this embodiment and 575 in the comparative example, and therefore the number of cycles according to this embodiment is 60% of the number of cycles in the comparative example, meaning a 40% reduction in the number of cycles.

According to this embodiment, as described above, the pull request bus, the push request/data bus, and the pull data return bus for returning pull data read from the file register of the calculator unit in the core circuit in response to a pull request, which are respectively connected to the plurality of core circuits in each core group, are provided between the core group including the plurality of core circuits and the scheduler circuit SCH. Moreover, each core circuit is provided with the pull data turn-back bus PLD_TB for transferring pull data pulled in response to a pull request to the pull data return bus, and the first selector SL1.

According to this configuration, a collision in the second selector SL2 between the pull data output from the calculator unit of the core circuit and the push request propagating along the push request/data bus is prevented. As a result, there is no need for the scheduler SCH to adjust the issue timings of a pull request and push request in order to avoid a collision in the core circuit. Furthermore, the pull data are transferred to the pull data return bus by the pull data turn-back bus in the core circuit from which the pull data are read, and therefore the latency needed for the pull request can be shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a plurality of arithmetic processing units, each having a calculator unit that includes a calculator and a register file;
a scheduler that is shared by the plurality of arithmetic processing units and controls a push instruction to write data to the register file in one of the plurality of arithmetic processing units and a pull instruction to read data from the register file in one of the plurality of arithmetic processing units;
a pull request bus to which the scheduler outputs a pull request corresponding to the pull instruction, the pull request bus being connected to each of the plurality of arithmetic processing units;
a push request bus to which the scheduler outputs a push request corresponding to the push instruction, the push request bus being connected to each of the plurality of arithmetic processing units; and
a pull data bus that inputs, into the scheduler, pull data read from the register file in one of the plurality of arithmetic processing units in response to the pull request, the pull data bus being connected to each of the plurality of arithmetic processing units,
each of the plurality of arithmetic processing units including:
a first router that routes a pull request that is destined for that arithmetic processing unit on the pull request bus to the calculator unit of that arithmetic processing unit;
a second router that routes a push request that is destined for that arithmetic processing unit on the push request bus to the calculator unit of that arithmetic processing unit;
a pull data turn-back bus that propagates pull data read from the register file of the calculator unit of that arithmetic processing unit to the pull data bus; and
a first selector that selects an input of either the pull data turn-back bus of that arithmetic processing unit or the pull data bus and outputs the selected input to the pull data bus.

2. The arithmetic processing device according to claim 1, wherein, when the scheduler outputs a first pull request to the pull request bus, in the arithmetic processing unit that is a destination of the first pull request, the first router routes the first pull request to the calculator unit of the destination, whereupon data in the register file of the destination are output as pull data from the calculator unit of the destination to the pull data turn-back bus of the destination and transferred via the first selector of the destination to the pull data bus.

3. The arithmetic processing device according to claim 1, wherein each of the plurality of arithmetic processing units further includes:
a pull/push bus that propagates given pull data read from the register file in the calculator unit of that arithmetic processing unit to the push request bus;
a third router that routes the given pull data read from the register file in the calculator unit of that arithmetic processing unit to either the pull data turn-back bus of that arithmetic processing unit or the pull/push bus of that arithmetic processing unit; and a second selector that selects a second input of either the pull/push bus of that arithmetic processing unit or the push request bus and outputs the selected second input to the push request bus.

4. The arithmetic processing device according to claim 3, wherein, when the scheduler outputs a pull/push request to the pull request bus, in the arithmetic processing unit that is a destination of the pull/push request, read data read by the calculator unit of the destination are routed to the pull/push bus of the destination by the third router of the destination, whereupon the second selector of the destination selects the read data on the pull/push bus of the destination and outputs the selected read data to the push request bus so that the read data are transferred to the arithmetic processing unit subsequent to the arithmetic processing unit that is the destination of the pull/push request.

5. The arithmetic processing device according to claim 3, further comprising a memory controller that controls access to a main memory,
wherein the scheduler outputs a write request to the memory controller to write the pull data input into the schedular to the main memory, outputs a read request to the memory controller to read data from the main memory, and outputs the read data read from the main memory to the push request bus together with the push request.

6. The arithmetic processing device according to claim 5, further comprising an instruction control circuit that transmits, to the scheduler, the pull instruction to execute the pull request and the push instruction to execute the push request,
wherein, in response to the pull instruction, the scheduler outputs the pull request to the pull request bus and outputs the pull data input into the schedular corresponding to the pull request to the memory controller together with the write request, and
in response to the push instruction, the scheduler outputs the read request to the memory controller and outputs the read data read from the main memory to the push request bus together with the push request.

7. The arithmetic processing device according to claim 1, further comprising a memory controller that controls access to a main memory,
wherein the scheduler outputs a write request to the memory controller to write the pull data input into the schedular to the main memory, outputs a read request to the memory controller to read data from the main memory, and outputs the read data read from the main memory to the push request bus together with the push request.

8. The arithmetic processing device according to claim 7, further comprising an instruction control circuit that transmits, to the scheduler, the pull instruction to execute the pull request and the push instruction to execute the push request,
wherein, in response to the pull instruction, the scheduler outputs the pull request to the pull request bus and outputs the pull data input into the schedular corresponding to the pull request to the memory controller together with the write request, and
in response to the push instruction, the scheduler outputs the read request to the memory controller and outputs the read data read from the main memory to the push request bus together with the push request.

9. The arithmetic processing device according to claim 1, wherein the plurality of arithmetic processing units are divided into a plurality of arithmetic processing groups, and each of the plurality of arithmetic processing groups includes its own scheduler, pull request bus, push request bus, and pull data bus.

10. The arithmetic processing device according to claim 9, further comprising a memory controller that controls access to a main memory, wherein in each of the plurality of arithmetic processing groups, the scheduler of that arithmetic processing group outputs a write request to the memory controller to write pull data to the main memory, outputs a read request to the memory controller to read data from the main memory, and outputs read data read from the main memory to the push request bus of that arithmetic processing group together with a push request.

11. A method of controlling an arithmetic processing device, the arithmetic processing device including:

a plurality of arithmetic processing units, each having a calculator unit that includes a calculator and a register file;

a scheduler that is shared by the plurality of arithmetic processing units and controls a push instruction to write data to the register file in one of the plurality of arithmetic processing units and a pull instruction to read data from the register file in one of the plurality of arithmetic processing units;

a pull request bus to which the scheduler outputs a pull request corresponding to the pull instruction, the pull request bus being connected to each of the plurality of arithmetic processing units;

a push request bus to which the scheduler outputs a push request corresponding to the push instruction, the push request bus being connected to each of the plurality of arithmetic processing units; and a pull data bus that inputs, into the scheduler, pull data read from the register file in one of the plurality of arithmetic processing units in response to the pull request, the pull data bus being connected to each of the plurality of arithmetic processing units, the method comprising:

in each of the plurality of arithmetic processing units:

routing, by a first router, a pull request that is destined for that arithmetic processing unit on the pull request bus to the calculator unit of that arithmetic processing unit;

routing, by a second router, a push request that is destined for that arithmetic processing unit on the push request bus to the calculator unit of that arithmetic processing unit;

propagating, by a pull data turn-back bus, pull data read from the register file of the calculator unit of that arithmetic processing unit to the pull data bus; and selecting, by a first selector, an input of either the pull data turn-back bus of that arithmetic processing unit or the pull data bus and outputting the selected input to the pull data bus.

* * * * *